United States Patent von der Embse et al.

[11] Patent Number: 5,903,549
[45] Date of Patent: May 11, 1999

[54] GROUND BASED BEAM FORMING UTILIZING SYNCHRONIZED CODE DIVISION MULTIPLEXING

[75] Inventors: Urban A. von der Embse, Westchester; Ken Yu Huang, Redondo Beach; Donald C.D. Chang, Thousand Oaks; William W. Mayfield, Torrance, all of Calif.

[73] Assignee: Hughes Electronics Corporation, Los Angeles, Calif.

[21] Appl. No.: 08/803,934

[22] Filed: Feb. 21, 1997

[51] Int. Cl.$^6$ .............................. H04B 7/00; H04B 7/185; H04B 7/216
[52] U.S. Cl. .......................... 370/310; 455/13.1; 370/320
[58] Field of Search ....................... 370/208, 209, 370/316, 320, 335, 342, 350, 310, 441, 515, 203, 389, 206; 375/200, 206; 342/352, 356, 354; 455/12.1, 13.3, 13.1, 272, 427, 428, 430, 13.4

[56] References Cited

U.S. PATENT DOCUMENTS

| 5,218,619 | 6/1993 | Dent | 375/1 |
| 5,555,257 | 9/1996 | Dent | 455/13.3 |
| 5,594,941 | 1/1997 | Dent | 370/310 |

*Primary Examiner*—Chi H. Pham
*Assistant Examiner*—Afsar M Qureshi
*Attorney, Agent, or Firm*—Terje Gudmestad; Georgann S. Gruenbach; Michael W. Sales

[57] ABSTRACT

A method permitting beam forming at a ground station for providing a coherent and stable uplink signal to a satellite system employing multiple spot beams by combining orthogonal synchronous code division multiplex codes and pseudo-random spreading codes with an information signal to implement a satellite feeder uplink.

18 Claims, 6 Drawing Sheets

Where:
$N_e$ = Phased array elements
$N_b$ = Phased array beams
$N_g$ = Ground station feeders
$N_{ch}$ = Communication signals (channels)
$R_s$ = Frequency band sample rate (bandwidth)
$R_{ch}$ = Signal (Channel) sample rate (bandwith)

And the:
Feeder - Satelite
  $R_{ch} N_e$ = Link bandwith (sample rate)

User - Satelite
  $R_s$ = Link bandwith (sample rate)

Forward and Return Links
  $R_s N_e$ = Total bandwith (sample rate)

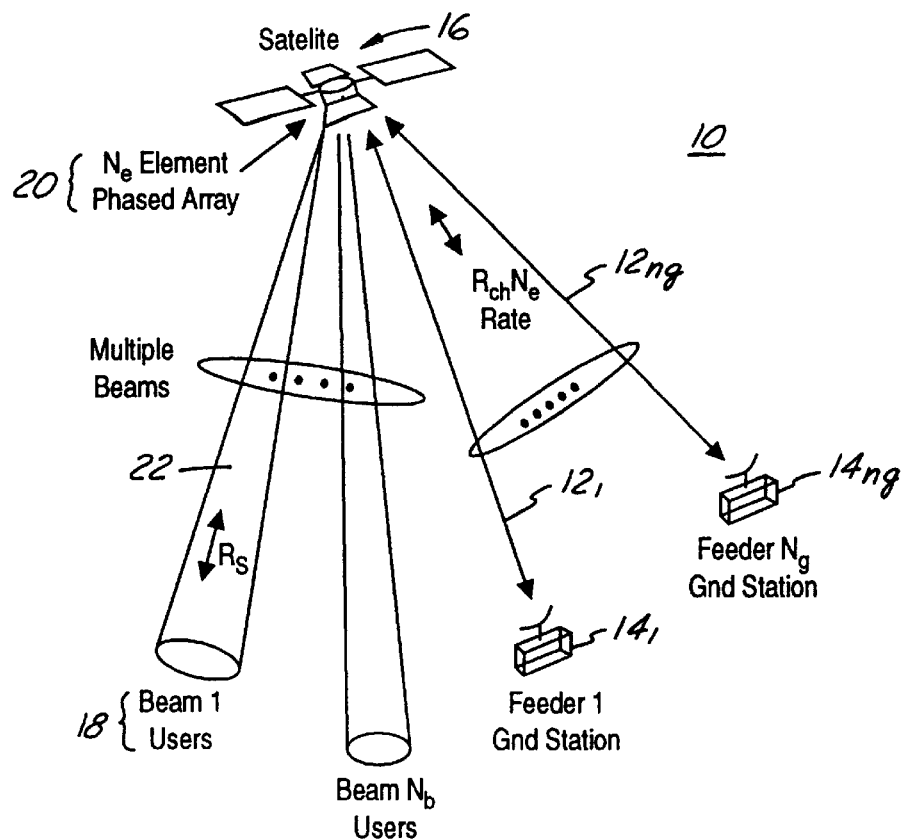

Where:
  $N_e$ = Phased array elements
  $N_b$ = Phased array beams
  $N_g$ = Ground station feeders
  $N_{ch}$ = Communication signals (channels)
  $R_s$ = Frequency band sample rate (bandwidth)
  $R_{ch}$ = Signal (Channel) sample rate (bandwith)

And the:
  Feeder - Satelite
    $R_{ch} N_e$ = Link bandwith (sample rate)

User - Satelite
    $R_s$ = Link bandwith (sample rate)

Forward and Return Links
    $R_s N_e$ = Total bandwith (sample rate)

FIG. 1

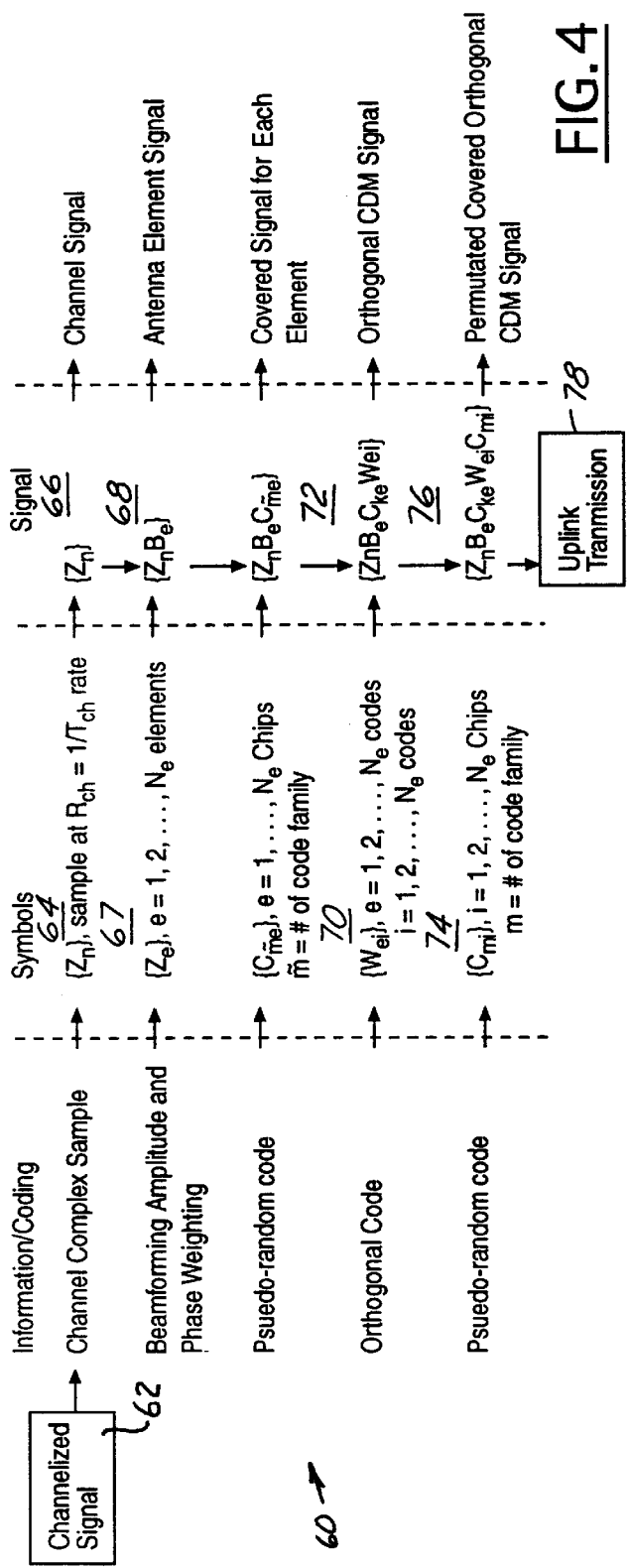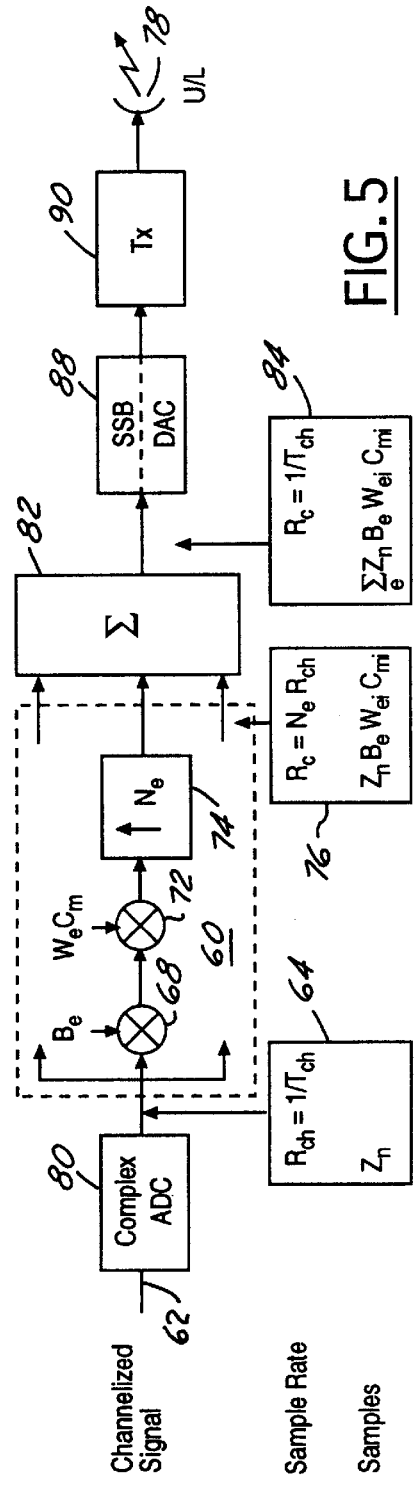
FIG. 4
FIG. 5

GROUND BASED BEAM FORMING UTILIZING SYNCHRONIZED CODE DIVISION MULTIPLEXING

TECHNICAL FIELD

The present invention relates to the signal links between a ground station and a satellite 16, and more particularly, to the use of synchronized code division multiplex (S-CDM) with orthogonal and pseudo-random spreading codes for the feeder links between the ground station and the satellite such that sufficient relative coherency and stability is maintained between these multiple paths to support ground based beam forming.

BACKGROUND ART

Ground station to satellite 16 systems include mobile satellite programs where multiple spot beams are engaged to connect a large number of mobile users at L-Band or S-Band frequencies to a hub station or gateway between the ground station and satellite operating at Ku-Band or C-Band frequencies. Multiple spot beams are generated using either a phased array or a reflector antenna with an array feed. Current systems may utilize more than 100 feed elements and may beam form combinations of these to generate up to several hundred beams.

Beam forming is implemented by adjusting the amplitude and phase of each signal path routed to each feed element. Each individual signal path is routed to multiple feeds with relative amplitudes and phases which define each intended beam.

On many satellite programs, beam forming is accomplished by constructing a fixed beam forming network behind the feed array. The ports on one side of this network are routed to the feed elements. Ports on the other side are routed by payload hardware in the feeder link to the ground station.

With a fixed beam former, the beam pattern must be configured prior to launch and cannot easily be adapted while in orbit if coverage requirements change after launch. To provide such an ability, recent mobile satellite programs have employed an onboard digital signal processor (DSP) which performs digital beam forming allowing an entire beam pattern to be re-optimized at any time during the life of the spacecraft. The DSP, however, adds significant weight and power to the payload.

Ground based beam forming provides the same or greater flexibility than digital beam forming onboard the satellite without the weight and power penalty of an on-board DSP. The difficulty with ground based beam forming, however, is that multiple paths (one for each feed element) must be maintained between the beam former located on the ground and each feed element located on the spacecraft with relative phase coherency and sufficient amplitude and phase stability to support accurate beam forming.

Most satellite feeder links requiring multiple paths employ Frequency Division Multiplexing (FDM) whereby each path is transferred between the ground station and the satellite on a separate frequency. While coherency is usually not a requirement, it is difficult to maintain coherency in an FDM feeder because the paths are subject to frequency dispersion in either system elements or in the propagation path. As a result most prior art programs requiring beam forming have implemented either fixed or digital beam forming onboard satellite The present invention overcomes this problem by utilizing a Code Division Multiplexer (CDM) feeder with a novel architecture using orthogonal and pseudo-random CDM codes which permits ground based beam forming with a significant reduction in payload processor complexity. This use of both orthogonal and pseudo-random CDM codes enables a CDM feeder to have the required coherency and stability to support ground system beam forming.

SUMMARY OF THE INVENTION

It is an object of the present invention to provide a satellite feeder link having the necessary coherency and stability to permit ground-based beam forming.

It is a further object of the invention to provide a ground station beam forming system which significantly reduces the payload complexity compared to the payload processing required for on-board beam forming.

The present invention incorporates a general architecture for ground beam forming which exploits the properties of both orthogonal CDM and pseudo-random CDM codes to avoid propagation and synchronization decorrelation errors. Further, the present invention results in the lowest payload complexity compared with FDM and TDM as measured by a commonly used digital payload processing complexity metric $\Psi$.

The above mentioned complexity metric is determined from equivalent multiply rates which are used to measure the relative complexity of digital signal processing for communication, radar, infrared and navigation systems. Addition rates when suitably scaled will reflect the considerably lower complexity of adders versus multipliers which can be included in the metric. Analog-to-digital (ADC) and digital-to-analog (DAC) signal processing, respectively, perform input and output conversion for the digital signal processor (DSP). The complexity of these input/output (I/O) signal processing functions can be mapped into an equivalent multiply rate to generate the contribution $\Psi$ (I/O) to the complexity metric.

The complexity metric may then be determined from the following equation when normalized by the signal band:

$$\Psi = R_M T + \alpha R_A T + \Psi(I/O)$$

= the equivalent number of real multiples per complex sample;

where the undefined terms are:

T=complex sample interval (1/signal band)

$R_M$=real multiply rate $R_A$=the real add rate, and $\alpha$=relative complexity of adders to multipliers ~ to 0.1

The invention is best described using forward link digital signal processing, although the invention can also be implemented using equivalent analog techniques. The input signal is sampled to produce a string of complex samples which contain all the signal (channel) information. A sample index "n" refers to the sample time. Each sample is multiplied by the set of antenna element amplitudes and phase weights. For each antenna element this creates a separate unlink signal sampled at specific intervals. Each element signal is then encoded with a unique code from a sample of orthogonal CDM codes. The output signal is thereafter upsampled which increases the sample rate to a relationship between the chip rate and chip length respectively of the orthogonal CDM code. The output signal for each channel is a function of the number of chips with respect to an interval corresponding to the sample where the orthogonal CDM code is a family over the sequence of chips.

A pseudo-random CDM code is overlayed on the orthogonal coded channels in order to provide the two fundamental performance improvements: (a) significant reduction in the dynamic range of the time waveform for the channel signals, and (b) spreading of the orthogonal CDM coded signals uniformly over the frequency band to ensure that each channel signal occupies the whole band. The code covering or overlay operation (a) is over each of the channel input signals. For (b), the overlaying transformation is a multiplication of the corresponding CDM code chips so that the output signal streams for each channel are related to the code and the chip. Further, this overlaying operation is a covering or permutation of the orthogonal CDM code phases on the unit circle, which reserves the orthogonality of the CDM codes. A preferred architecture combines the orthogonal and pseudo-random codes prior to encoding the element signals.

BRIEF DESCRIPTION OF THE DRAWINGS

FIG. 1 is a pictorial representation of the present invention utilizing beam forming at the ground stations;

FIG. 4 is a diagrammatic representation of CDM signal architecture applied through the forward link of the beam forming network;

FIG. 5 is a block diagram of CDM signal transmission for the forward link described in FIG. 4;

BEST MODES FOR CARRYING OUT THE INVENTION

Figure 2A:
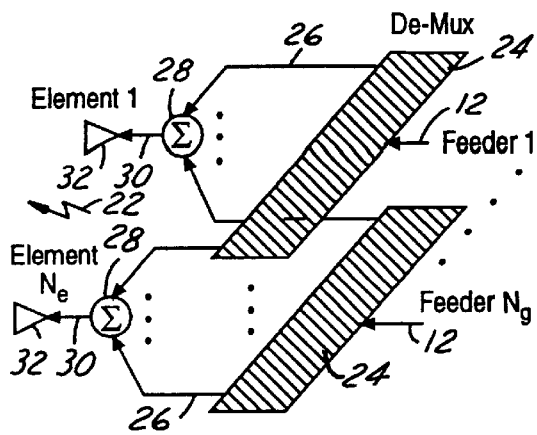
FIG. 2a is a pictorial representation of the forward link signal flow path for ground beam forming at the ground stations.

Performing the payload beam forming signal processing operation on the ground is an extremely attractive approach to the architecture for a multiple-beam communication system 10, such as shown in FIG. 1. In this regard, the system 10 is able to offload the complexity of performing onboard beam forming and avoid decorrelation between the beam forming antenna element signal paths 12 between one or more ground feed stations 14 and a satellite 16.

For the forward link from the ground feed stations 14 to the users 18 via a satellite multiple-beam payload 20, this decorrelation is caused by the amplitude and phase error between the uplink signals 12 sent to each of the satellite payload downlink antenna elements. This decorrelation causes degraded directivity and sidelobe performance in the downlink beams 22 which can result in unacceptable communications link performance. The critical error sources contributing to this decorrelation are caused by the transmission path phase, amplitude and timing variations and by the ground-to-payload phase and timing variations. For the return links from the users 18 back to the feeder ground stations 14 via the multiple-beam payload 20, the same requirement holds for the signals downlinked to the ground stations from each uplink antenna receive element.

The present invention incorporates architecture using synchronized code division multiplexing (S-CDM) to achieve a high potential for reducing payload complexity while avoiding decorrelation of the element signals 12. Alternative methods using either frequency division multiplexing (FDM), time division multiplexing (TDM), or a combination thereof to transfer the element signals 12 between the ground stations and the satellites 16 do not provide the same inherent advantages of the S-CDM system of the present invention.

In comparing onboard beam forming and FDM and TDM ground beam forming using the representative multiple-beam communication systems the communication link parameters and link architectures are defined in FIG. 1 for ground beam forming. For onboard beam forming, and referring now to FIGS. 2a and 2b, the same link architecture applies with the feeder-to-satellite data rates reduced by the number of antenna elements $N_e$, since the data rate expansion required to feed each phase element is performed onboard. Referring now to FIG. 2a, multiplexed signals $12_{1-Ng}$ from feeder ground stations $14_{1-Ng}$ are coupled into demultiplexers $24_{1-Ng}$ each having a signal output 26 coupled into a summation circuit 28 having an output 30 coupled into an antenna element 32 for transmission over beams 22 to users 18.

Figure 2B:
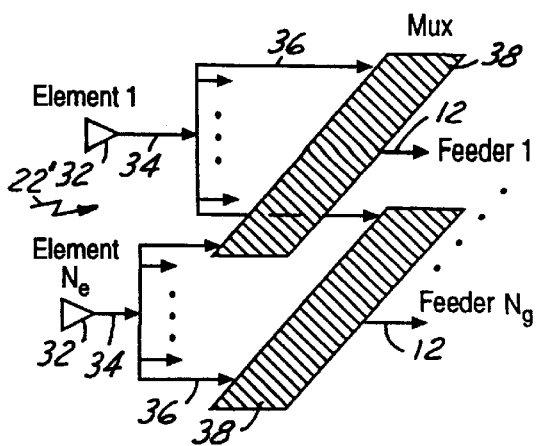
FIG. 2b is a pictorial representation of the return link signal flow path for ground beam forming at the ground stations.

Conversely, and referring now to FIG. 2b, users 18 uplink signals 22 are received on phased array elements 32 in the payload 20 with the signals 34 coupled over lines 36 into multiplexers 38 with the multiplexed signals transmitted to feeder ground stations 14 over signal links 12.

With reference to the above, total bandwidth calculation assumes the communication signals (or channels) 12 fully occupy the frequency band $R_{ch}N_{ch}=R_s$. Total bandwidth shrinks to $R_{ch}N_{ch}<N_e$, when the band is partially occupied. Link data rates are referenced to the equivalent digital sample rates. These sample rates are greater than the Nyquist rate for the noise equivalent communication bandwidth, and therefore are greater than the communication signal rate since communication signals are transmitted at the Nyquist rate. Signal flow paths in FIGS. 2a and 2b for ground beam forming apply to onboard beam forming when the de-multiplexing and multiplexing operations are assumed to include onboard beam forming signal processing.

The complexity of the payload processing is largely due to the two key performance issues described hereinafter and assuming a digital implementation and evaluating an appropriate complexity metric, $\Psi$. Relative complexity inclusions should carry over to analog implementations and to a combination thereof. The most meaningful metric for estimating the relative complexity of a payload processor for the different architectures is based on the total multiply rates and the total addition rates. It can be shown that the total processor complexity tends to be scalable from the complexity of performing the multiple and add operations. The scaling factor should remain essentially constant between the architectures being evaluated.

Although the input/output (I/O) contribution $\Psi$ (I/O) is a significant portion of $\Psi$, it is outside the scope of the present invention and, therefore, will not be taken into account in order to focus on the direct multiply and add signal processing operations. Accordingly, the corresponding complexity metric $\Psi$ can be defined as:

$$\Psi = R_M \times T + \alpha R_A \times T$$

i.e., equals the equivalent number of real multiplies per complex sample, where:

T=complex sample interval (1/signal band)

$R_M$=the real multiply rate $R_A$=the real add rate, and

α=the relative complexity of adders to multipliers ~ 0.1.

Onboard beam forming architecture assumes frequency division communications, sampling repeater processing of each uplink signal or channel with a computationally efficient digital processing architecture and downlink digital beam forming.

Figure 3:
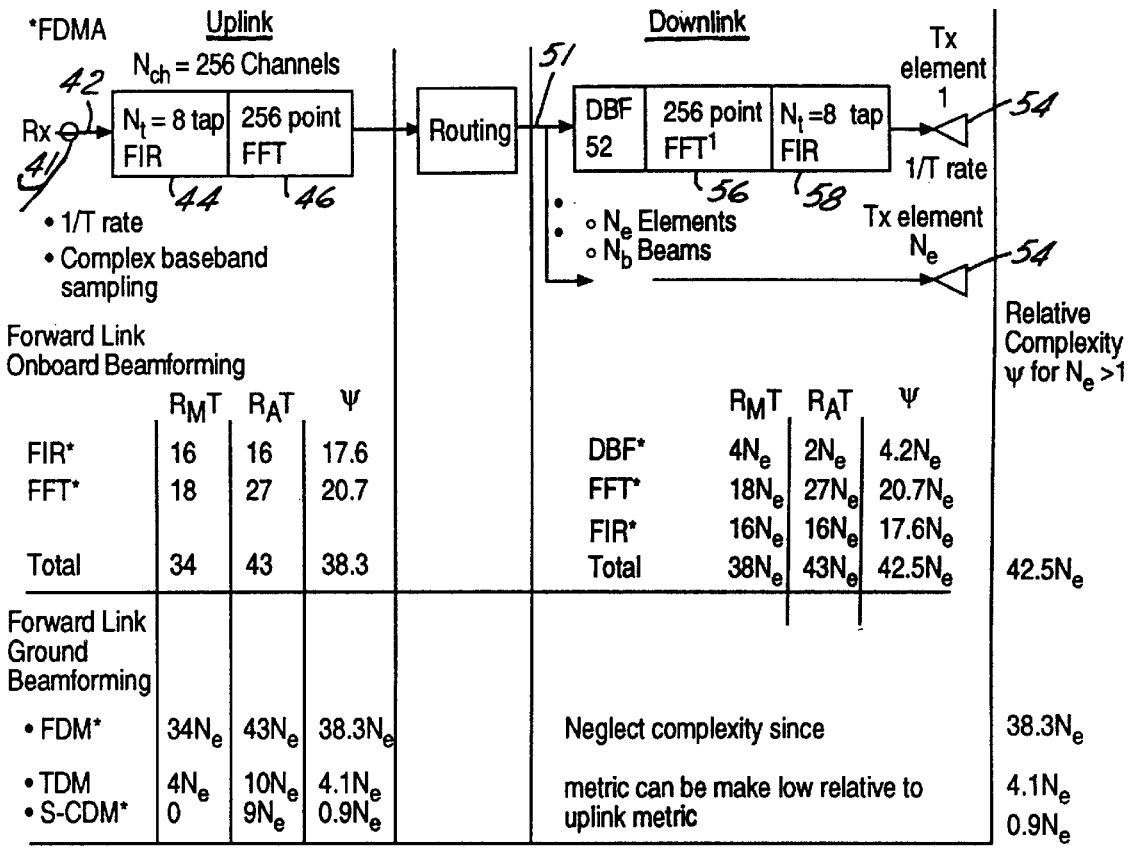
FIG. 3 is a diagrammatic representation showing the relative complexity of payload processing for beam forming.

Referring now to FIG. 3, the uplink signal channel 41 filtering of the signal flow 42 recovers signal information at the signal (channel) sample rate $R_{ch}=1/T_{ch}$ by forming identical Finite Impulse Response (FIR) filters 44 centered at each of the $N_{ch}$ signals (channels) uniformly spaced at $R_{ch}$. The FIR time response extends over $N_T$ of the $T_{ch}$ channelization intervals to provide good channelization filtering, which means the FIR extends over $N_T N_{ch} T$ time interval where T is the complex baseband sampling interval depicted in FIG. 3. A realization of a well-known computationally-efficient algorithm is assumed in FIG. 3 and consists of a weighted $N_T$ tap FIR followed by a $N_{ch}$ point Fast Fourier Transfer (FFT) 46 at the $T_{ch}$ intervals. Hereinafter, multiply and add calculations refer to this processing architecture.

Downlink Beam Forming (DBF) 52 and construction of the downlink signal wave form weighing starts by performing the DBF amplitude and phase weighing arithmetic operations for each beam and each element on the signal 51 samples routed to each element. This is followed by reconstructing the signals for each element using an inverse form of the computationally efficient uplink algorithm as shown in FIG. 3. This algorithm performs the inverse FFT 56 followed by the downlink FIR 58 filtering to generate the signal waveform at each element $54_{1-Ne}$. Multiply and add operations are the same as the uplink. Computational complexity metric Ψ is evaluated for using the realistic assumption that the number of beam forming radiating element $N_E$ is much larger than unity.

For ground beam forming, each signal 12 is assigned to a separate ground station 14, where $N_g=N_{ch}$ as depicted in FIG. 1. It is implicitly assumed that the signal band is fully populated with signals or channels $R_{ch} N_{ch}=R_S$. For applications where the signal band is not fully populated with channels, that is, $R_{ch} N_{ch}$ is less than $R_S$, means that the complexity metric Ψ being calculated is too large and the complexity advantage of the ground beam forming will be larger than predicted.

For the FDM uplink, estimation of the multiplication and additional contributors to the complexity metric follows the same procedure as set forth above for the uplink when taking into account the different link parameters. Each channel 12 from the ground is replicated $N_E$ times to be able to transmit the amplitude and phase weighing to each of the antenna elements 32 as well as the channel information. This increases the signal band to $R_{ch} N_e$ and the total uplink band from all ground stations to $R_{ch} N_{ch} N_e=R_S N_e$. Compared to the FDMA band for onboard processing which has a signaling band equal to $1/T=R_S$, the increase in the frequency band is equal to $N_e$. Accordingly, it is expected that the FDM uplink processing scales with $N_e$, which results in the values listed in FIG. 3. Accordingly, it should be expected that the FDM uplink processing scales with $N_e$ to a first order. Assuming that $N_e=N_{ch}=256$ to allow quantification results and to values listed in FIG. 3, equations used for the metric calculations are listed at the bottom of FIG. 3 and must be used with the appropriate sets of parameters. Complexity calculations for the TDM and the S-CDM follow the same realistic outlines as outlined above for FDM.

Relative performance of the S-CDM architecture of the present invention compared to onboard beam forming and the FDM and TDM ground beam forming is summarized as follows in Table 1:

TABLE 1

| Performance Issues Architecture | Critical Decorrelation Error Sources | Relative Complexity ψ compared to the ψ for the S-CDM* |
|---|---|---|
| ONBOARD BEAM FORMING | 0 | 47.2 |
| GROUND BEAM FORMING | | |
| FDM | Propagation path | 42.6 |
| TDM | Phase sync | 4.6 |
| S-CDM | 0 | 1 |

*The I/O contribution ψ (I/O) has not been included.

Relative complexity metric Ψ compared to the complexity Ψ for the architectures examined, is calculated using results from FIG. 3. Clearly, the S-CDM architecture invention offers the greatest promise of drastic reduction in the complexity of the onboard signal processing.

The second observation from Table 1 is that the S-CDM architecture invention is the only ground beam forming approach which does not suffer from fundamental critical decorrelation error sources. The FDM signal paths occupy different frequency bands for each element 32 and, accordingly, are susceptible to atmospheric fading, time delays, and phase shift variations with frequency. Further, the TDM signal phases occupy the same frequency band but at different time slots. This nullifies the atmospheric error sources, but at the expense of introducing phase variations in the signal recovery at the payload between the time slot corresponding to the different antenna elements. There are no known methods for keeping the phases variations small for synchronizing the low BT product TDM pulses needed to counter the atmospheric errors. Symbols B and T, respectively, refer to the frequency band of the pulse and the timed duration of the pulse. With the S-CDM architecture which will be described in the following, the uplink signals for each of the elements occupies the same frequency band over the same time interval, thereby eliminating the possibility of atmospheric errors. In addition, the high BT product combined with the synchronous transmission of the simultaneous orthogonal signals guarantees the absence of phase variations between the signals due to the synchronous tracking loops in the payload 20.

The present invention consists of a general architecture 10 for ground beam forming which exploits the properties of both orthogonal CDM and pseudo-random CDM codes to avoid propagation and synchronization decorrelation errors and provides the lowest payload complexity metric Ψ. These codes generally refer to CDMA applications, but in the present invention CDM application is the one being addressed. A description of the architecture starts with the novel approach for combining the orthogonal CDM and pseudo-random CDM codes into a coded waveform for transmission of the element signals between the ground station 14 and payload 20 antenna elements 32.

The signal architecture of the forward link 60 is defined as shown in FIG. 4. The forward link 60 will be used to describe the invention. Starting at the signal flow of the feeder ground terminal, the input signal 62 is sampled 64 at the rate $R_{ch}=1/T_{ch}$ to produce a stream of complex channel signal samples ($Z_n$) 66 which contain all the signal channel information. Index N is a sample index which refers to the sample time $n * T_{ch}$. Each sample is multiplied 67 by the set of $N_e$ antenna element amplitude and phase weights ($B_e$). For each antenna element E, this creates a separate antenna uplink signal $Z_n*B_e$ 68 sampled at $T_{ch}$ intervals. A pseudo-random code ($C_{ke}$) is overlayed on the element signals so that each element signal becomes ($Z_n B_e C_{ke}$). Each element signal is encoded with a unique code from a set of $N_e$ orthogonal CDM codes ($W_e$) 70. The output signal 72 is upsampled by $N_e$ which increases the sample rate to $N_e R_{ch} = R_c = 1/T_c$, where $R_c$, and $T_c$ are the chip rate and chip link, respectively, of the orthogonal CDM code. Output signal link for channel E is $Z_n B_e C_{ke} W_{ei}$ for I=1,2, . . . , $N_c$ chips over each $T_{ch} = N_e T_c$ interval corresponding to sample N, with the orthogonal CDM code E,70 of the family ($W_e$) as the $N_e$ code chips ($W_{ei}$) where I=1, . . . , $N_e$. A pseudo-random CDM code ($C_{mi}$) is overlayed on the orthogonal coded signal channels 72, where M refers to the code and I refers to the chip. This overlaying transformation is a multiplication of the corresponding CDM code chip so that the permutated orthogonal CDM output signal 76 strength for channel E is ($Z_n B_e C_{ke} W_{ei} C_{mi}$) where N and I are the sample times. Further, this overlaying operation is a covering for permutation of the orthogonal CDM code 70 phases of the unit cycle, which preserves the orthogonality of the CDM codes. This preferred architecture thus combines the orthogonal and pseudo-random codes into the code ($C_{ke} W_{ei} C_{mi}$) prior to including the element signals for uplink transmission 78.

A representative orthogonal CDM code is a Walsh code. Walsh codes are Hadamard codes arranged in an approximate ordering of increasing frequency content. These codes take ±1 values equivalent to 0, or 180° on the unit circle. A representative pseudo-random CDMA code is a Gold code. The Gold code takes a ±1 values. This means the permuted codes take ±1 values, all coding operations or sign changes and all decoding operations are sign changes followed by add-only operations. Thus, no multiplies are required.

A preferred digital implementation of the CDM uplink signal transmission 78 for the forward link 60 is shown in FIG. 5. Signal flow follows the signal architecture shown in FIG. 4. A complex analog-to-digital converter (ADC) samples the signal at the $R_{ch}=1/T_{ch}$ sample rate 64 which is equal to the CDM chip rate. The CDM encoding combines the orthogonal and pseudo-random codes and the upsampled outputs are summed 82 into a combined signal 84 covering the frequency band $N_e R_{ch}=1/T_c$. This composite signal is digital-to-analog (DAC) 86 converted and single-side-band (SSB) 88 upconverted to an IF frequency. The IF signal is coupled to the transmitter (Tx) 90 for conversion to an RF signal, and then transmitted on the uplink 78.

Figure 6:
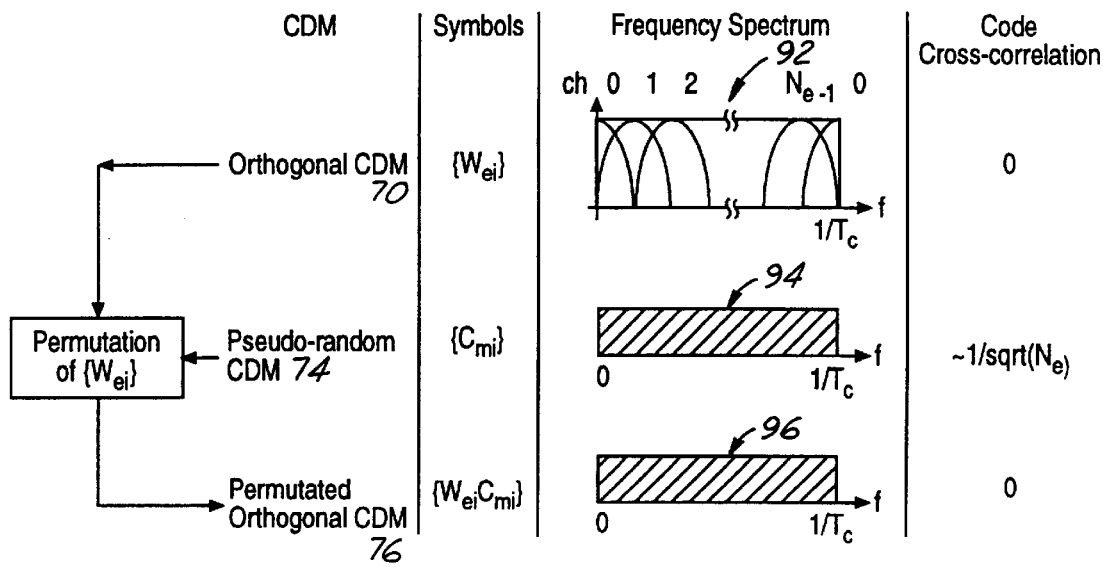
FIG. 6 is an illustrative comparison of the time-frequency signaling for the forward link illustrated in FIG. 4.

Time and frequency characteristics of the transmitted uplink signal are shown in FIG. 6. It has been discerned that the frequency spectrum 92 for the Walsh CDM codes tends to follow the spectrum for discrete fourier orthogonal codes, as shown in FIG. 6. Since the codes are orthogonal, the code cross-correlation is zero for zero time and frequency offsets. It also can be confirmed that the frequency spectrum 94 for the pseudo-random Gold codes is completely flat, as shown in FIG. 6. Permutation of the Walsh code by Gold codes spreads the Walsh codes over the sampling band $1/T_c$ 96 while preserving the orthogonality. This means the uplink signaling simultaneously transmits the antenna element signals while spreading them over the same frequency band. This eliminates propagation path induced decorrelation areas.

Synchronization of the satellite 16 payload 20 and the feeder at the ground is required to keep the timing error to within a fraction of a chip time $T_c$, and a frequency error to within a fraction of the CDM integration time which is equal to the sample interval $T_{ch}=1/R_{ch}$ of the input signal. The preferred approach to synchronization is to simultaneously transmit one or more pseudo-random CDM synchronization codes 74 along with the uplink 78 signaling. A pseudo-random code 74 has the same chip rate and timing as the CDM codes used for signaling, and is added to this signaling after the CDM processing 74, as depicted in FIG. 5, and prior to the digital to analog (DAC) conversion 86. The pseudo-random CDM sync codes 74 are transmitted at a much lower power level than the signaling so that their presence within the signaling frequency band is a very low level of thermal-like noise. The pseudo-random CDM sync codes 74 will be considerably longer than the signaling codes in order to provide a high signal-to-noise (SNR) energy ratio in the code recovery at the payload 20. A high SNR provides excellent receiver operating characteristic (ROC) performance for detection and false-alarm, and for driving the sync tracking to maintain the required time and frequency sync accuracies. A representative pseudo-random CDM sync code 74 is a Gold code from a family considerably longer than the code for permuting, i.e. covering, the orthogonal CDM signaling codes 70.

Figure 7:
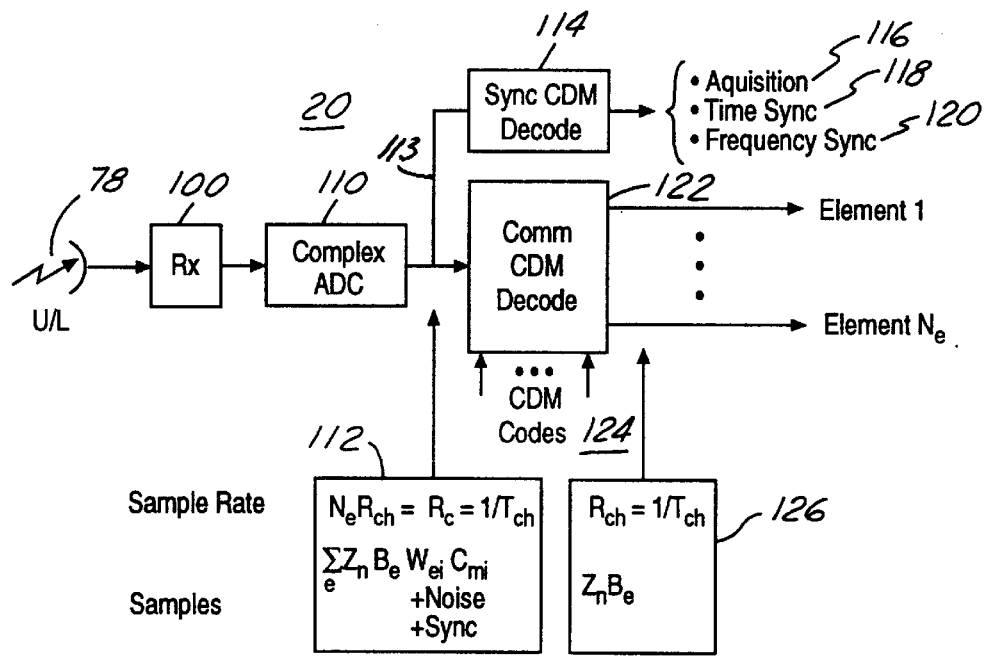
FIG. 7 is a block diagram illustrating the CDM uplink decoding at the satellite payload.

A preferred digital implementation of the CDM signal processing of the uplink (U/L) 78 at the satellite 16 payload 20 is shown in FIG. 7. U/L signal 78 is coupled through a receiver (Rx) 100 and into a complex analog-to-digital converter (ADC) 110. The output of the complex ADC 110 is a digitized stream of complex samples 112 of the uplink signal 78 CDM chip rate 84. Filtering prior to the ADC 110 establishes the frequency band in frequency synchronization with the uplink signal 78 and the ADC 110 operates in time sync with the uplink signal 78. This means the ADC output generates samples as the transmitted rate and in synchronization. As shown in FIG. 7, the samples are the uplink signal samples of FIG. 4 at the CDM chip rate plus the receiver (Rx) 100 and link 78 noise, plus the low level of the synchronous CDM coding which are coupled via 113 into the synchronous CDM decoder to separate and provide acquisition 116, time synchronization 118, and frequency synchronization 120 signals.

The output of ADC 110 is also coupled into the communication CDM decoder 122 which recovers a signal for each element e=1-$N_e$ by stripping off the orthogonal and pseudo-random CDM codes for each element. For the representative Walsh and Gold code example, this decoding of each element consists of adding the receive samples with the algebraic sign of the complement of ±1 encoding at the feeder, or with the code length of $N_e$ samples at 124. This strips the CDM code from the signaling for each element to recover the element signals ($Z_n B_e$) output 126 from the communication CDM decoder 122 as shown in FIG. 7. For other CDM codes of interest, only sign changes ±1 or ±j (complex number) are required, which means the recovery of the element signaling processor required add-only operations and no multiplies which greatly simplifies the payload 20 complexity metric Ψ.

Figure 8:
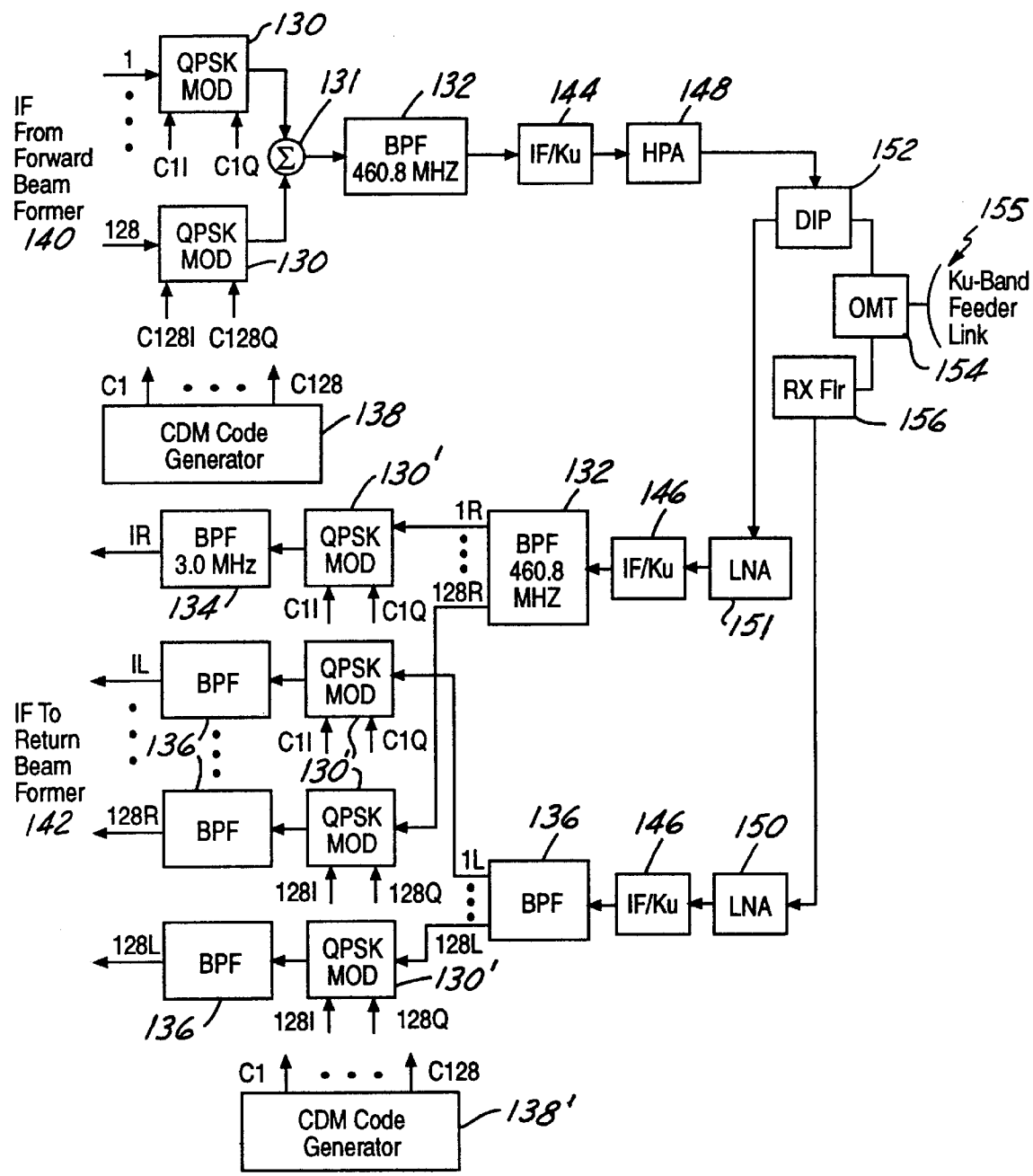
FIG. 8 is a block diagram of the ground station RF system incorporating the ground based beam forming, dual return CDM feeder of the present invention.

Referring now to FIG. 8, there is shown a block diagram of the ground based, beam forming system incorporating the present invention. During the ground station to satellite transmission phase of operation, Intermediate Frequency (IF) signals on forward beam former channels 1–128, shown at 140, are coupled into corresponding Quadrature Phase Shift Keying (QPSK) Modulators 130. Channel 1–128 inphase and quadrature CDM codes generated in CDM code generator 138, are combined with the IF signals in QPSK modulators 130 with the resultant signals thereafter combined in a summing network 131. The combined signal output of summing network 131 is coupled through a 460.8 MHz band pass filter (BPF) 132, an upconverter coupler/matching network (IF/Ku) 144, a high power amplifier (HPA) 148, and into a signal diplexer (DIP) 152. The transmit signal is then coupled into a transmit/receive diplexer (OMT) 154 during the transmit phase of operation of the Ku-Band feeder link antenna 155 for transmission to the satellite 16.

During the receive phase of operation, a signal from satellite 16 is received on antenna 155. The signal is coupled through diplexor 154, into receiver filter (Rx Flr) 156 and then through Low Noise Amplifier (LNA) 150, a downconverter IF/Ku 146 and into a band pass filter (BPF) network 136 to be separated into the constituent signals corresponding to channels 1–128. The signals are coupled into corresponding QPSK modulators 130' and combined with inphase and quadrature phase CDM code signals generated in CDM code generator 138'. Also during the receive portion of operation, the transmit signal coupled into diplexor 152 is coupled into transmitter signal LNA 151 and through an IF/Ku downconverter circuit 146 into BPF 132 to be reconstituted into the channel 1–128 signals. The transmit signals of channels 1–128 are then coupled through corresponding QSPK modulators 130' and BPFs 134,136 and, along with received signals for channels 1–128, are coupled as IF signals into the return beam former circuits 142. These transmit signals are used for synchronization of the received IF signals.

Figure 9:
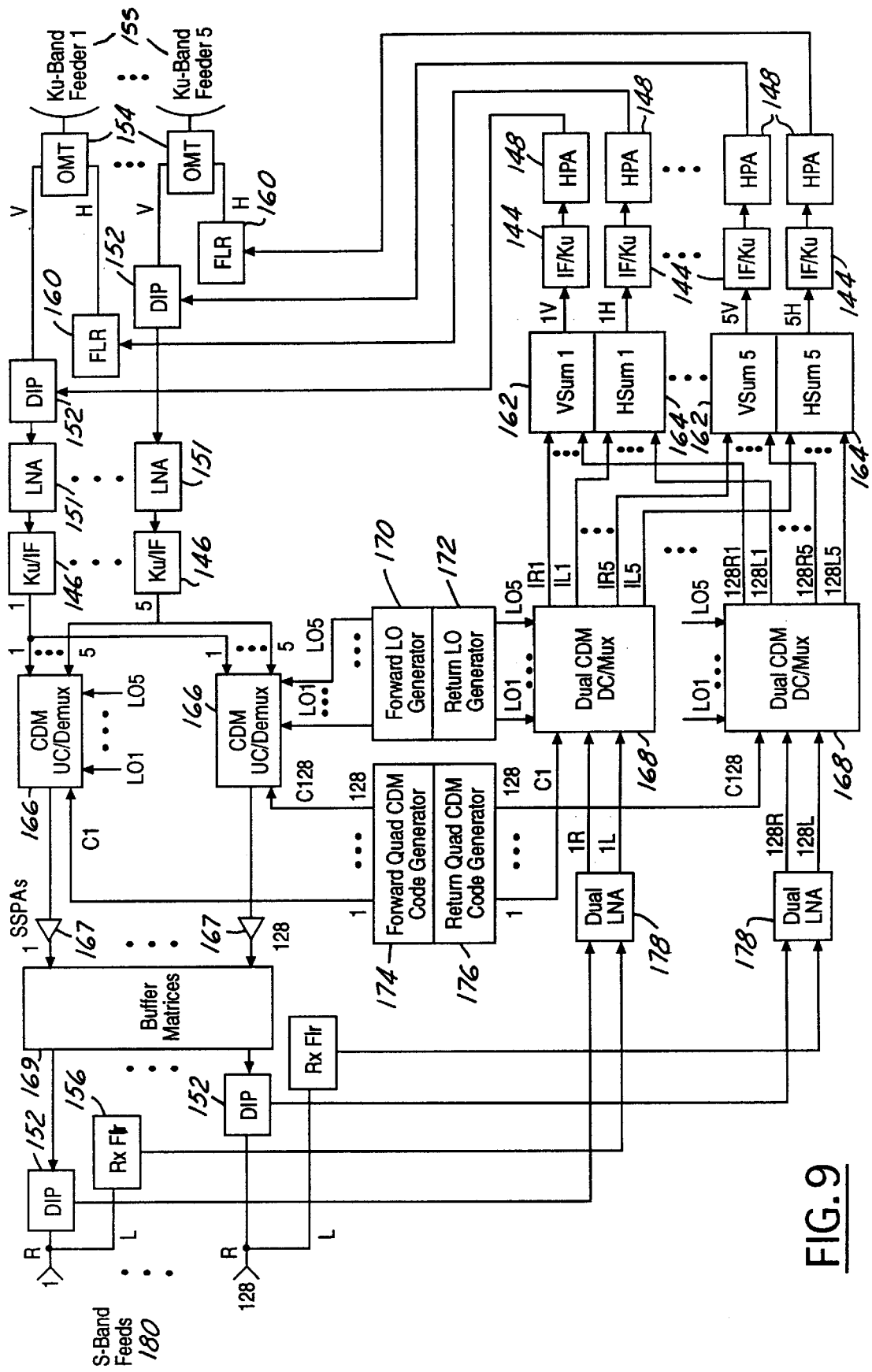
FIG. 9 is a block diagram of the payload system forming the satellite portion of the ground station beam forming, dual return CDM feeder of the present invention.

Referring now to FIG. 9, there is shown a block diagram of the satellite 16 payload 20 portion of the beam forming system incorporating the present invention. Signals from the beam forming groundstations 14 are received on satellite 16 Ku-band feeder antennas 155. Hereinafter, as each channel operates in an identical fashion, the operation of only one channel will be described in detail.

The signal received at antenna 155 is coupled through T/R diplexor 154, diplexor 152, low noise amplifier 151 frequency downconverter(Ku/IF) 146 and into CDM upconverter/multiplexer 166. The signal is combined with a local oscillator signal generated in forward local oscillator generator 170 and with a CDM code generated in forward quadrature CDM code generator 174. The signal is then coupled through solid-state power amplifiers (SSPA) 167 and loaded into buffer matricies 169 prior to coupling through diplexor 152 into S-Band feeds 180 for transmission over beams 22 to users 18.

The return signal from users 18 is received on S-Band Feeds 180 with the signal being coupled through diplexor 152 and simultaneously, through receiver filter 156, with both parts of the split signal coupled into separate channels of dual low noise amplifiers 178. The signals are then coupled into dual CDM downconverter/multiplexers 168, to be combined with return quadrature CDM code signals generated in return quadrature CDM code generator 176 and with return local oscillator signals generated in return local oscillator signal generator 172. The combined signals are then coupled into vertical and horizontal summation networks 162 and 164, respectively.

The signal of vertical summation network 162 is coupled through an IF/Ku frequency upconverter 144, diplexor 152, and T/R waveguide 154 to the Ku-Band feeder antenna 155 for transmission to the respective feeder ground station 14. At the same time, the signal of horizontal summation network 164 is coupled through an IF/Ku frequency upconverter 144, filter 160 and, alternately with the vertical summation signal, into T/R waveguide 154 to feed into the Ku-Band feeder antenna 155 to be alternately transmitted to the respective feeder ground station 14.

Although particular embodiments of the present invention have been illustrated in the accompanying drawings and described in the foregoing detailed description, it is to be understood that the present invention is not limited to just the embodiments disclosed, but that they are capable of numerous rearrangements, modifications, and substitutions without departing from the scope of the claims hereafter.

What is claimed is:

1. A method of beam forming at a ground station used in a satellite system employing multiple information carrying transmission links, comprising the steps of:

spreading each of said transmission links using an orthogonal spreading code, each of said links occupying substantially the same frequency band over the same time interval;

combining said spread links into an uplink feeder signal and transmitting same to a satellite;

receiving a downlink feeder signal from the satellite;

separating the downlink feeder signal into a plurality of transmission links; and removing the orthogonal spreading code from the plurality of transmission links so as to permit retrieving any information carried by the transmission links.

2. A method of beam forming at a ground station used in a satellite system employing multiple information carrying transmission links, comprising the steps of:

spreading each of said transmission links using an orthogonal spreading code by encoding separate transmission links with a unique orthogonal Code Division Multiplex (CDM) code;

combining said spread links into an uplink feeder signal and transmitting same to a satellite;

receiving a downlink feeder signal from the satellite;

separating the downlink feeder signal into a plurality of transmission links; and removing the orthogonal spreading code from the plurality of transmission links to permit retrieving any information carried by the transmission links.

3. The method of claim 2 further including the steps of summing the spread transmission links and overlaying a pseudo-random CDM code on the summed spread transmission links.

4. A method of beam forming at a ground station used in a satellite system employing multiple information carrying transmission links, comprising the steps of:

spreading each of said transmission links using an orthogonal spreading code;

combining said spread links into an uplink feeder signal and transmitting same to a satellite;

receiving a downlink feeder signal from the satellite;

separating the downlink feeder signal into a plurality of transmission links;

removing the orthogonal spreading code from the plurality of transmission links to permit retrieving any information carried by the transmission links; and converting the uplink feeder signal from a digital signal to an analog signal prior to transmission.

5. The method of claim 4 further including the step of upconverting the analog uplink feeder signal to a single-sideband Intermediate Frequency (IF) signal prior to transmission.

6. A method of beam forming at a ground station used in a satellite system employing multiple information carrying transmission links, comprising the steps of:
  spreading each of said transmission links using an orthogonal spreading code;
  combining said spread links into an uplink feeder signal and transmitting same to a satellite;
  receiving a downlink feeder signal from the satellite;
  separating the downlink feeder signal into a plurality of transmission links;
  removing the orthogonal spreading code from the plurality of transmission links to permit retrieving any information carried by the transmission links; and
  selecting the orthogonal spreading codes from a Walsh type Hadamard code arranged in an approximate order of increasing frequency content.

7. The method of claim 6 including further selecting said spreading codes to provide ±1 on a unit circle.

8. A method of beam forming at a ground station used in a satellite system employing multiple information carrying transmission links, comprising the steps of:
  spreading each of said transmission links using an orthogonal spreading code;
  combining said spread links into an uplink feeder signal and transmitting same to a satellite;
  receiving a downlink feeder signal from the satellite;
  separating the downlink feeder signal into a plurality of transmission links;
  removing the orthogonal spreading code from the plurality of transmission links to permit retrieving any information carried by the transmission links; and
  synchronizing the satellite system with the feeder signals by simultaneously transmitting at least one pseudo-random synchronization code with the uplink signal.

9. The method of claim 8 where said synchronizing step includes the step of keeping timing error between the ground station and the satellite proximate to a chip time, $T_c$.

10. The method of claim 8 where said synchronizing step includes the step of keeping frequency error between the ground station and the satellite proximate to a CDM integration time is equal to a channel sample interval, $T_{ch}$ where:
  $T_{ch}=1/R_{ch}$, $R_{ch}$ being the channel sample rate.

11. A ground based beam former for use with a satellite system, comprising:
  a complex Analog-to-Digital Converter (ADC) for receiving a channelized signal input and providing a plurality of complex sample outputs, $Z_n$;
  the plurality of complex sample outputs $Z_n$ thereafter coupled through a forward link for providing a plurality of premutated orthogonal CDM signal outputs; and
  the CDM signal outputs coupled through a summing network and a Digital-to-Analog Converter (DAC) into an uplink transmitter for transmission to said satellite.

12. The forward link of claim 11 including a first multiplier section receiving said sample outputs $Z_n$ and multiplying each by a separate one of a set of antenna elements $N_e$ amplitudes and weights, $B_e$, for providing a plurality of separate uplink signals, $Z_n B_e$.

13. The forward link of claim 12 including a first encoding section receiving the plurality of separate uplink signals, $Z_n B_e$ and encoding same using an orthogonal CDM code $W_{ei}$ to produce a plurality of orthogonal CDM output signals, $Z_n B_e W_{ei}$.

14. The forward link of claim 13 including a second encoding section receiving the plurality of orthogonal CDM output signals, $Z_n B_e W_{ei}$ and encoding same using a pseudo-random code $C_{mi}$ to produce a plurality of permutated orthogonal CDM output signals, $Z_n B_e W_{ei} C_{mi}$.

15. The forward link of claim 12 including an encoding section receiving the plurality of separate uplink signals, $Z_n B_e$ and encoding same using an orthogonal CDM code $W_{ei}$ and a pseudo-random code $C_{mi}$ to produce a plurality of permutated orthogonal CDM output signals, $Z_n B_e W_{ei} C_{mi}$.

16. The summing network of claim 15 operative to receiving the plurality of permutated orthogonal CDM output signals, $Z_n B_e W_{ei} C_{mi}$, and provide a composite digital signal output.

17. The DAC of claim 16 operative to receive the composite digital signal output and convert it to an analog signal output.

18. The beam former of claim 17 further including a single-side-band (SSB) converter for receiving the analog signal output from the DAC and upconverting it to an IF signal; and
  coupling the IF signal into the uplink transmitter for conversion to a RF signal and transmission to the satellite.

* * * * *